(12) United States Patent
Dewachter

(10) Patent No.: US 8,791,215 B2
(45) Date of Patent: Jul. 29, 2014

(54) SYSTEM AND REACTOR FOR IMPROVED POLYMER HOMOGENEITY

(71) Applicant: Total Research & Technology Feluy, Seneffe (BE)

(72) Inventor: Daan Dewachter, Mechelen (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

(21) Appl. No.: 13/923,440

(22) Filed: Jun. 21, 2013

(65) Prior Publication Data

US 2013/0287634 A1 Oct. 31, 2013

Related U.S. Application Data

(62) Division of application No. 13/376,522, filed as application No. PCT/EP2010/058602 on Jun. 18, 2010, now Pat. No. 8,513,365.

(30) Foreign Application Priority Data

Jun. 18, 2009 (EP) .................................... 09163053

(51) Int. Cl.
*C08F 2/00* (2006.01)
*C08F 210/00* (2006.01)
*F01N 3/20* (2006.01)

(52) U.S. Cl.
USPC ............................. 526/64; 526/348; 422/105

(58) Field of Classification Search
USPC .................................... 526/64, 348; 422/105
See application file for complete search history.

(56) References Cited

FOREIGN PATENT DOCUMENTS

WO   WO 2005/077994   * 8/2005

* cited by examiner

*Primary Examiner* — William Cheng

(57) ABSTRACT

The present invention relates to a process for the polymerization of an olefin monomer. In particular, the present invention relates to a process for the polymerization of an olefin monomer and one or more optional comonomers in presence of a polymerization catalyst and hydrogen, said process being characterized by an improved control of the hydrogen concentration in the polymerization reactor. In addition, the present invention provides for an improved hydrogen feeding system to a polymerization reactor. Furthermore, the present invention provides for a polymerization reactor comprising such an improved hydrogen feeding system.

13 Claims, 2 Drawing Sheets

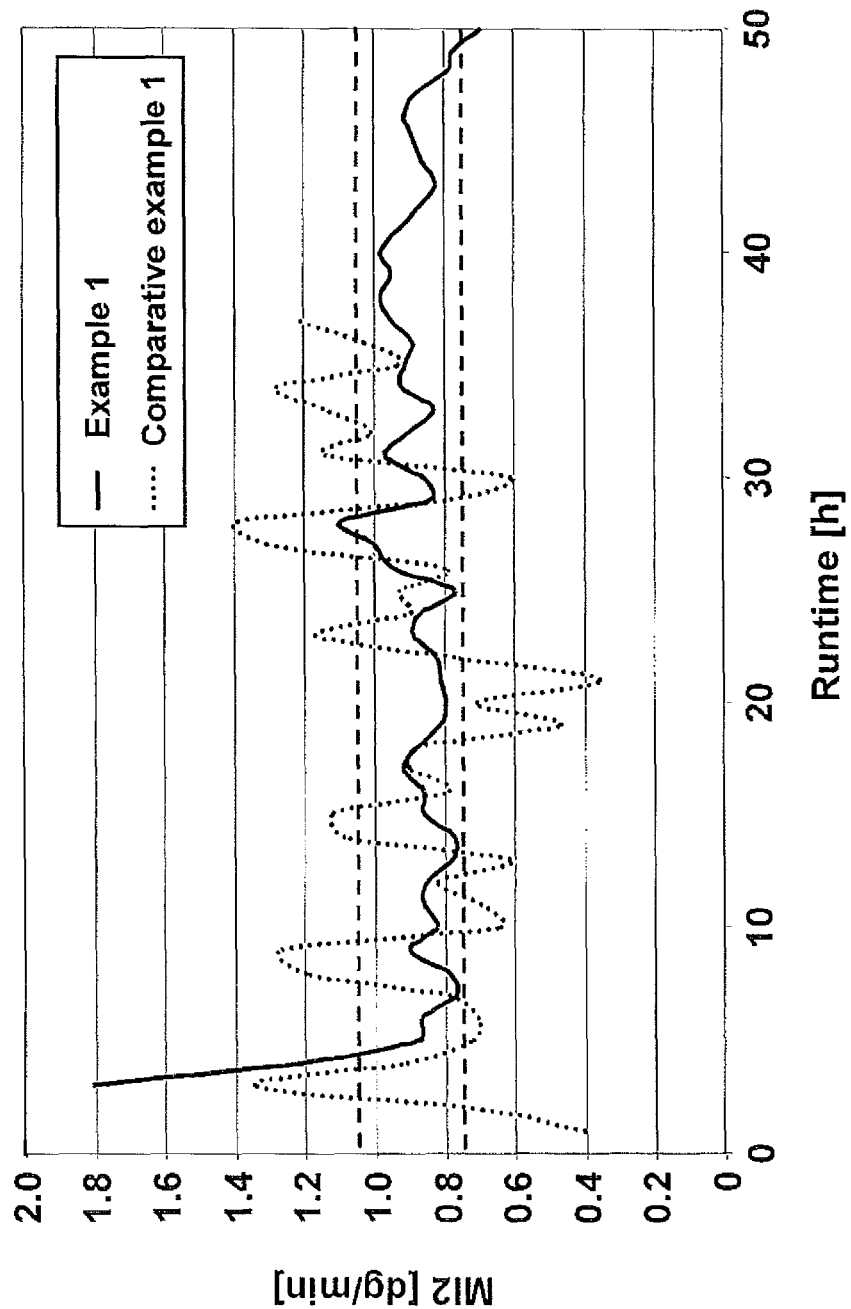

SYSTEM AND REACTOR FOR IMPROVED POLYMER HOMOGENEITY

CROSS-REFERENCE TO RELATED APPLICATIONS

This application is a Divisional of U.S. application Ser. No. 13/376,522, filed on Mar. 8, 2012, now U.S. Pat. No. 8,513,365, which claims the benefit of PCT/EP2010/058602, filed on Jun. 18, 2010, which claims priority from EP 09163053.3, filed on Jun. 18, 2009.

FIELD OF THE INVENTION

The present invention relates to a process for the polymerization of an olefin monomer. In particular, the present invention relates to a process for the polymerization of an olefin monomer and one or more optional comonomers in presence of a polymerization catalyst and hydrogen, said process being characterized by an improved control of the hydrogen concentration in the polymerization reactor. In addition, the present invention provides for an improved hydrogen feeding system to a polymerization reactor. Furthermore, the present invention provides for a polymerization reactor comprising such an improved hydrogen feeding system.

THE TECHNICAL PROBLEM AND THE PRIOR ART

Polyolefins are typically produced by polymerization of an olefin monomer and one or more optional comonomers in a polymerization reactor. The polymerization is conducted in presence of a polymerization catalyst, and hydrogen, which is used as a chain terminating agent.

The properties of the polyolefins are controlled by appropriate choice of the polymerization conditions, such as temperature, pressure and concentrations of the components making up the polymerization medium, including the reactants. One of the most important properties is the melt flow rate, which gives an indication of the average length of the polymer chains. Polymer chain length is essentially determined by the concentration of hydrogen in the polymerization reactor. A higher hydrogen concentration in the reactor leads to shorter polymer chains and by consequence to a polyolefin having a higher melt flow rate. By contrast, a lower hydrogen concentration leads to longer polymer chains and therefore to a polyolefin having a lower melt flow rate.

The hydrogen concentration that is required to produce a polyolefin of a targeted melt flow rate depends upon the type of polymerization catalyst. Thus, when producing a polyolefin of identical melt flow rate, polymerization catalysts with a low sensitivity to hydrogen, such as a chromium-based catalyst, require a higher concentration of hydrogen than polymerization catalysts with a higher sensitivity to hydrogen, such as for example metallocene-based polymerization catalysts.

Controlling the hydrogen concentration in the polymerization reactor poses a particular challenge because generally the hydrogen concentration is low in comparison to the concentrations of other components of the polymerization medium, such as the olefin monomer, and because changes in hydrogen concentration have a big effect on the melt flow rate of the polyolefin. It is therefore very important to control the hydrogen concentration as closely as possible to a pre-determined set-point, thereby allowing the production of a polyolefin having uniform properties, not just within one single production campaign but also from one production campaign to the next.

WO 2007/113308 by the same applicant discloses a polymerization process having improved control of the hydrogen concentration in a polymerization reactor in that the hydrogen/monomer ratio along the path of the reactor is controlled by multiple, spatially separated feeding of hydrogen along the path of the reactor. While the disclosed polymerization process has improved the uniformity and consistency of the polyolefins produced with this process, control of the hydrogen concentration is still not sufficient for polymerization catalysts that are very responsive to hydrogen, such as for example metallocene-based catalysts.

In view of the above, there remains a need in the art to provide a process for improving the polymerization of an olefin monomer in a polymerization reactor.

In particular there remains a need to provide a process for the polymerization of an olefin monomer in a polymerization reactor, said process being characterized by improved control of the hydrogen concentration in the polymerization reactor.

Thus, it is an object of the present invention to provide an improved process for the polymerization of an olefin monomer.

More in particular, it is an object of the present invention to provide a polymerization process, which is characterized by an improved control of the concentration of hydrogen in a polymerization reactor during polymerization.

It is another object of the present invention to provide an improved hydrogen feeding system for feeding hydrogen to a polymerization reactor.

The present invention further aims to provide a polyolefin having improved compositional homogeneity and improved quality.

Furthermore, it is an object of the present invention to provide a polyolefin having an improved melt flow rate consistency.

BRIEF DESCRIPTION OF THE INVENTION

We have now discovered that at least one of the above objectives can be met when the hydrogen is fed to the polymerization reactor at a well-defined ratio of hydrogen feed line volume to hydrogen mass flow.

Thus, the present invention provides a process for the polymerization of an olefin monomer and one or more optional comonomers in a polymerization reactor, said process comprising the steps of
  (a) feeding an olefin monomer, one or more optional comonomers, at least one polymerization catalyst, and hydrogen to the polymerization reactor,
  (b) polymerizing said olefin monomer and the one or more optional comonomers to produce an olefin polymer, and
  (c) discharging said olefin polymer from the polymerization reactor,
characterized in that the hydrogen in step (a) is fed to the polymerization reactor at a ratio of hydrogen feed line volume to hydrogen mass flow of at most $5.0 \, l \, kg^{-1} \, h$.

Further, the present invention provides a hydrogen feeding system for feeding hydrogen to a polymerization reactor for the polymerization of an olefin monomer and one or more optional comonomers, said hydrogen feeding system comprising
  at least one hydrogen feeding points for feeding hydrogen to the polymerization reactor,
  at least one controlling means for controlling hydrogen mass flow, and at least one flow measuring means to determine the hydrogen mass flow to the polymerization reactor, said hydrogen feeding system characterized in that hydrogen is fed to the polymerization reactor at a ratio of hydrogen feed line volume to hydrogen mass flow of at most $5.0 \, l \, kg^{-1} \, h$.

Furthermore, the present invention provides a polymerization reactor comprising such a hydrogen feeding system.

The polymerization processes that can be improved in accordance with the present invention are intended to include all polymerizations of an olefin monomer and one or more optional comonomers wherein hydrogen is used to control the length of the polymer chains. The present invention will be further disclosed in detail hereunder. The description is only given by way of example and does not limit the invention. The reference numbers relate to the annexed figures.

BRIEF DESCRIPTION OF THE DRAWINGS

FIG. 2 is a graph comparing the melt flow stability of a production campaign in accordance with the present invention with the melt flow stability of a production campaign that was not conducted in accordance with the present invention. The dashed straight lines parallel to the x-axis represent the allowed lower and higher limits for the MI2.

DETAILED DESCRIPTION OF THE INVENTION

Figure 1:
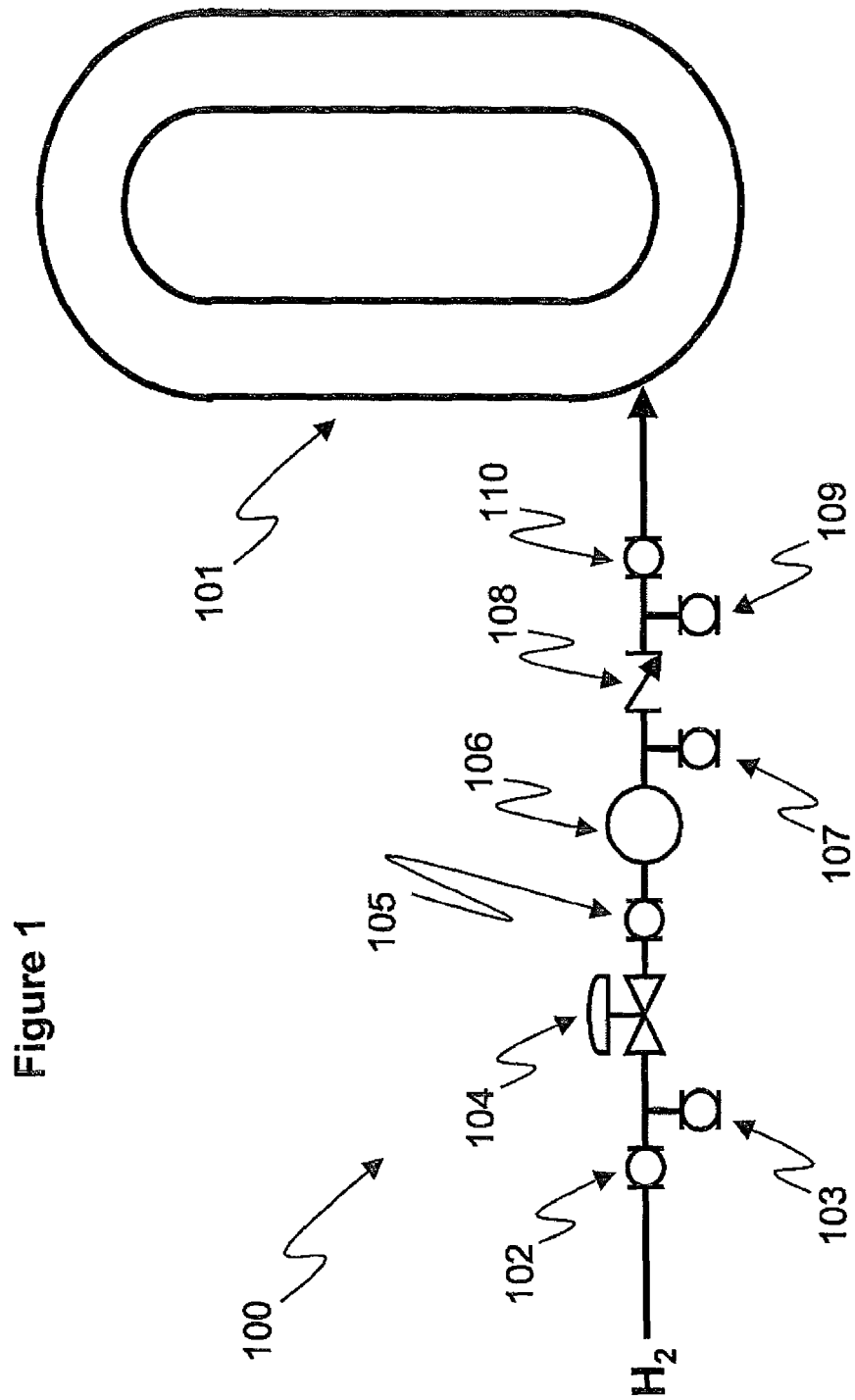
FIG. 1 is a schematic representation of an embodiment of a hydrogen injection system according to the invention.

For the purposes of the present invention the term "polymerization" is meant to include "copolymerization".

For the purposes of the present invention the term "bulk polymerization" refers to a polymerization using liquid or supercritical olefin monomer as polymerization medium. This does not exclude that other hydrocarbons originating from the olefin feed stream or generated in the polymerization reactor itself are present. In the case of the bulk polymerization of propylene it is not excluded that the polymerization medium comprises up to 10 wt % of propane.

For the purposes of the present invention the term "slurry polymerization" refers to a polymerization done in a liquid diluent that is inert under polymerization conditions, i.e. the polymerization is done in a system essentially consisting of a liquid phase and a solid phase, wherein the liquid phase comprises an inert diluent, the olefin monomer, the one or more optional comonomers and hydrogen and the solid phase comprises the at least one polymerization catalyst and the polyolefin.

For the purposes of the present invention the term "gas phase polymerization" refers to a polymerization conducted in the gaseous phase.

The present invention provides a process for the polymerization of an olefin monomer and one or more optional comonomers in a polymerization reactor, said process comprising the step of feeding an olefin monomer, one or more optional comonomers, at least one polymerization catalyst, and hydrogen to the polymerization reactor. Optionally, an activating agent having an ionizing action is also fed to the polymerization reactor. Optionally, a diluent that is inert under polymerization conditions may also be fed to the polymerization reactor. Said olefin monomer and the one or more optional comonomers are then polymerized to produce an olefin polymer (also called a "polyolefin").

The olefin monomer used in the present invention preferably is an α-olefin. More preferably, the olefin monomer is selected from the group consisting of ethylene, propylene, butene-1, iso-butene, pentene-1, hexene-1,4-methyl-pentene-1, and octene-1. Most preferably, the olefin monomer is either ethylene or propylene.

Optionally, the olefin monomer may be copolymerized with one or more comonomers, said one or more comonomers being different from the olefin monomer. The type of comonomer is not particularly limited as long as the one or more comonomers are capable of forming a copolymer with the olefin monomer. However, it is preferred that the one or more optional comonomers are α-olefins. More preferably, the one or more comonomers are selected from the group consisting of ethylene, propylene, butene-1, pentene-1, hexene-1,4-methyl-pentene-1, and octene-1. If the olefin monomer is ethylene, the most preferred comonomers are selected from the group consisting of butene-1, hexene-1 and octene-1. If the olefin monomer is propylene, the most preferred comonomer is ethylene.

The process of the present invention is not intended to be limited to a specific type of polymerization technology nor to any specific type or shape of polymerization reactor. It may be used for example in bulk polymerization, slurry polymerization, or gas phase polymerization. Depending upon the olefin monomer, certain polymerization technologies may be preferred over others. For example, when the olefin monomer is ethylene, slurry polymerization or gas phase polymerization is preferred, and when the olefin monomer is propylene, bulk polymerization or gas phase polymerization is preferred.

Suitable polymerization reactors to which the process of the invention can be applied include but are not limited to stirred tank reactors, loop reactors, gas phase reactors, tubular reactors, autoclaves, and combinations thereof. It is, however, preferred that the polymerization reactor used in the present invention is a loop reactor or a gas phase reactor. It is most preferred that it is a loop reactor.

The polymerization process according to the present invention can also be applied if at least two polymerization reactors are serially connected and the polyolefin produced in one reactor is transferred to the following polymerization reactor, wherein the polymerization reaction is continued, either under the same or different polymerization conditions, thus producing polyolefin fractions having different properties, such as for example a different molecular weight. The process of the present invention may then be applied to any one of the polymerization reactors to which hydrogen is fed. This can also be more than one or even all polymerization reactors.

The polymerization technologies and reactors used in the present invention are well known to the person skilled in the art and need not be explained in more detail.

Slurry polymerization is performed in a diluent that is inert under polymerization conditions. Suitable diluents include but are not limited to hydrocarbon diluents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Nonlimiting illustrative examples of suitable diluents are propane, butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. Of these butane, isobutane, pentane, hexane, heptane, cyclopentane, cyclohexane, cycloheptane, methyl cyclopentane, methyl cyclohexane, isooctane are preferred. If ethylene is the olefin monomer the most preferred diluent is isobutane. However, it should be clear from the present invention that other diluents may as well be applied according to the present invention.

The polymerization of an olefin monomer and one or more optional comonomers is conducted in presence of at least one polymerization catalyst. The polymerization catalyst may be selected from the group consisting of chromium catalysts, Ziegler-Natta catalysts and single-site catalysts. Preferably, the polymerization catalyst used in the present invention is a Ziegler-Natta or a single-site catalyst. Most preferably, it is a single-site catalyst.

The term "chromium catalysts" refers to catalysts obtained by deposition of chromium oxide on a support, e.g. a silica or aluminum support. Illustrative examples of chromium catalysts comprise but are not limited to $CrSiO_2$ or $CrAl_2O_3$.

The term "Ziegler-Natta catalyst" refers to a catalyst of the general formula $MX_n$, wherein M is a transition metal selected from group IV to VII, wherein X is a halogen, and wherein n is the valence of the transition metal. Preferably, M is a group IV, group V or group VI metal, more preferably titanium, zirconium or vanadium, and most preferably titanium. Preferably X is chlorine or bromine, and most preferably chlorine. Illustrative example of the transition metal compounds include $TiCl_3$ and $TiCl_4$. In a particularly preferred embodiment of the invention said catalyst is a titanium tetrachloride ($TiCl_4$) catalyst. It is preferred that the transition metal compound $MX_n$ is supported on a magnesium halide, e.g. magnesium chloride, in active form.

Single-site polymerization catalysts are characterized by the fact that they have a single active polymerization site. The best known groups of single-site polymerization catalysts are metallocene-based catalysts and the so-called constrained-geometry single-site catalysts. Of these, metallocene-based catalysts are preferred.

The metallocene in a metallocene-based catalyst can be described by the following chemical formulas
for a bridged metallocene

and for an unbridged metallocene

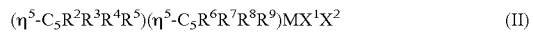

wherein
the bridge $R^1$ is —$(CR^{10}R^{11})_p$— or —$(SiR^{10}R^{11})_p$— with p=1 or 2, preferably it is —$(SiR^{10}R^{11})$—;
M is a metal selected from Ti, Zr and Hf, preferably it is Zr;
$X^1$ and $X^2$ are independently selected from the group consisting of halogen, hydrogen, $C_1$-$C_{10}$ alkyl, $C_6$-$C_{15}$ aryl, alkylaryl with $C_1$-$C_{10}$ alkyl and $C_6$-$C_{15}$ aryl;
$R^2$, $R^3$, $R^4$, $R^5$, $R^6$, $R^7$, $R^8$, $R^9$, $R^{10}$ and $R^{11}$ are each independently selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighboring R may form a cyclic saturated or non-saturated $C_4$-$C_{10}$ ring; each $R^2$, $R^3$, $R^4$, $R^5$, $R^6$, $R^7$, $R^8$, $R^9$, $R^{10}$ and $R^{11}$ may in turn be substituted in the same way.

Examples of particularly suitable metallocenes are:
bis(cyclopentadientyl)zirconium dichloride
bis(tert-butyl-cyclopentadienyl)zirconium dichloride
dimethylsilanediyl-bis(cyclopentadienyl)zirconium dichloride,
dimethylsilanediyl-bis(2-methyl-cyclopentadienyl)zirconium dichloride,
dimethylsilanediyl-bis(3-methyl-cyclopentadienyl)zirconium dichloride,
dimethylsilanediyl-bis(3-tert-butyl-cyclopentadienyl)zirconium dichloride,
dimethylsilanediyl-bis(3-tert-butyl-5-methyl-cyclopentadienyl)zirconium dichloride,
dimethylsilanediyl-bis(2,4-dimethyl-cyclopentadienyl)zirconium dichloride,
dimethylsilanediyl-bis(indenyl)zirconium dichloride,
dimethylsilanediyl-bis(2-methyl-indenyl)zirconium dichloride,
dimethylsilanediyl-bis(3-methyl-indenyl)zirconium dichloride,
dimethylsilanediyl-bis(3-tert-butyl-indenyl)zirconium dichloride,
dimethylsilanediyl-bis(4,7-dimethyl-indenyl)zirconium dichloride,
dimethylsilanediyl-bis(tetrahydroindenyl)zirconium dichloride,
dimethylsilanediyl-bis(benzindenyl)zirconium dichloride,
dimethylsilanediyl-bis(3,3'-2-methyl-benzindenyl)zirconium dichloride,
dimethylsilanediyl-bis(4-phenyl-indenyl)zirconium dichloride,
ethylene-bis(indenyl)zirconium dichloride,
ethylene-bis(tetrahydroindenyl)zirconium dichloride,
isopropylidene-(3-tert-butyl-5-methyl-cyclopentadienyl) (fluorenyl)zirconium dichloride.

Constrained-geometry single-site catalysts comprise a half sandwich compound, which can be described by the following chemical formula

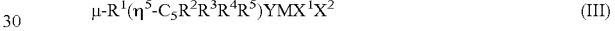

wherein
the bridge $R^1$ is —$(CR^{10}R^{11})_p$— or —$(SiR^{10}R^{11})_p$— with p=1 or 2, preferably it is —$(SiR^{10}R^{11})$—;
M is a metal selected from Ti, Zr and Hf, preferably it is Zr;
$X^1$ and $X^2$ are independently selected from the group consisting of halogen, hydrogen, $C_1$-$C_{10}$ alkyl, $C_6$-$C_{15}$ aryl, alkylaryl with $C_1$-$C_{10}$ alkyl and $C_8$-$C_{15}$ aryl;
$R^2$, $R^3$, $R^4$ and $R^5$ are each independently selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighboring R may form a cyclic saturated or non-saturated $C_4$-$C_{10}$ ring; each $R^2$, $R^3$, $R^4$ and $R^5$ may in turn be substituted in the same way, and
Y is a group that is capable of coordinating to the metal M, such as for example $NR^{12}R^{13}$, $PR^{12}R^{13}$, $OR^{12}$ or $SR^{12}$, with $R^{12}$ and $R^{13}$ each independently selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighboring R may form a cyclic saturated or non-saturated $C_4$-$C_{10}$ ring; each $R^{12}$ and $R^{13}$ may in turn be substituted in the same way.

An overview of metallocene-based polymerization catalysts can for example be found in L. Resconi et al., Chemical Reviews 2000, 100, 1253-1345. An overview of constrained-geometry single-site catalysts can for example be found in European patent application EP-A-0416815, or in H. Braunschweig et al., Coordination Chemistry Reviews 250 (2006) 2691-2720

Preferably, the metallocene-based polymerization catalysts and the constrained-geometry single-site catalysts used in the present invention comprise a support.

Preferably, the catalysts used in conjunction with the present invention are activated with an activating agent having an ionizing action.

Such catalysts and activating agents are commercially available and well known to the person skilled in the art. Therefore they need not be described in more detail.

Hydrogen is used to control the molecular chain length of the polymers produced in the polymerization process of the present invention. The higher the hydrogen concentration in the reactor, the lower the melt flow rate of the polymer will be and vice versa. As the melt flow rate has a direct influence on polymer processability in transformation processes, i.e. film forming, and the product consistency, it is important to be able to tightly control the hydrogen concentration and minimize variations in the reactor.

In the context of the present application the term "consistency" relates to the product consistency within a given lot of polymer produced but also to the consistency from one lot of polymer produced to the next.

To this end, it is an essential element of the present invention that hydrogen is fed to the polymerization reactor at a ratio of hydrogen feed line volume to hydrogen mass flow of at most $5.0\,l\,kg^{-1}\,h$, preferably of at most $4.0\,l\,kg^{-1}\,h$, more preferably of at most $3.0\,l\,kg^{-1}\,h$, even more preferably of at most $2.0\,l\,kg^{-1}\,h$, and most preferably of at most $1.0\,l\,kg^{-1}\,h$. Preferably the ratio of hydrogen feed line volume to hydrogen mass flow is at least $0.001\,l\,kg^{-1}\,h$, and most preferably at least $0.01\,l\,kg^{-1}\,h$. The hydrogen feed line volume is the volume of the hydrogen feed line between the hydrogen flow controlling means and the entry into the polymerization reactor. It is preferred that the hydrogen feed line volume be as small as possible.

Hydrogen is fed to the polymerization reactor through at least one hydrogen feeding (or injection) point. Preferably, hydrogen is fed to the polymerization reactor through at least two hydrogen feeding points, for example two, three, four, five, six, seven or eight feeding points.

In accordance with the present invention, in a preferred embodiment, a process is provided comprising mixing hydrogen with the olefin monomer and optionally with the one or more optional comonomer(s), prior to injection into the polymerization reactor. Thus, olefin monomer and hydrogen may be fed in conjunction with each other and at suitable ratios, e.g. through at least one common feeding entry. Because the at least one common feeding entry is used to feed hydrogen to the polymerization reactor, it is for the purposes of the present application to be considered a hydrogen feeding point though the skilled person will recognize that the at least common feeding entry might require different flow controlling means etc. as compared to a pure hydrogen feeding line. In the case of mixing hydrogen with the olefin monomer and optionally with the one or more optional comonomer(s) prior to injection to the polymerization reactor, the hydrogen feed line volume is the volume of the hydrogen feed line between the hydrogen flow controlling means and the entry into the mixing means wherein hydrogen and the olefin monomer and optionally the one or more optional comonomer(s) are mixed.

The present invention is particularly advantageous if the polymerization reactor has an elongated shape. Preferably, the polymerization reactor has a ratio of length to diameter of at least 2, preferably of at least 5, and most preferably of at least 10. In the case of such an elongated polymerization reactor it is preferred that there are at least two hydrogen feeding points along the path of the reactor, for example two, three, four, five, six, seven or eight feeding points. The terms "path" and "flow path" of the reactor are used synonymously and are defined as the internal route followed by the reactant stream and the polymer produced in the reactor.

Preferably, the at least two hydrogen feeding points are positioned spatially separated from each other. In the case of an elongated polymerization reactor it is preferred that the at least two hydrogen feeding points are positioned spatially separated from each other along the path of the reactor, more preferably at equal distances from one another along the path of the reactor. Such an arrangement of the hydrogen feeding points helps in keeping the hydrogen concentration in the polymerization reactor as uniform as possible. Alternatively, the at least two hydrogen feeding points may be provided at non-equidistant positions on the reactor.

Particularly suitable locations for the hydrogen feeding points may be chosen in function of reaction parameters, such as reaction temperature, ratio between the concentrations of hydrogen and monomer, reactant flow etc.

In the case of a loop reactor the at least one hydrogen feeding point is preferably positioned close to bottom or top elbows of the loop reactor. In a more preferred embodiment, at least one of the hydrogen feeding points is located downstream of and adjacent to a circulating means, such as for example a reactor pump, which directionally circulates polymer slurry along the path of the reactor.

Provided that there are at least two hydrogen feeding points, it is preferred that the hydrogen mass flow is separately controlled for each hydrogen feeding line leading to the at least two hydrogen feeding points. In one embodiment, each hydrogen feeding line is provided with or connected to a separate flow controlling means for controlling the mass flow of hydrogen into the reactor. In another embodiment, the number of flow controlling means is lower that the number of hydrogen feeding points. The multiple flow controlling means can be spatially separated, or they can be centralized and close to each other in space.

The produced olefin polymer may be discharged from the polymerization reactor. This may be done either by continuous or discontinuous discharge means, such as for example by settling legs.

The advantages of the present invention are most evident for polymerization reactors having a high ratio of length to diameter. An example of a particularly suited polymerization process is a polymerization in a loop reactor, in combination with polymerization catalysts having high hydrogen response, in particularly metallocene-based catalysts.

The Applicant has shown that feeding hydrogen at the above ratio of hydrogen feed line volume to mass flow enables to dampen fluctuations in hydrogen concentrations in the reactor. By maintaining the ratio of hydrogen feed line volume to hydrogen mass flow at a suitable level while feeding hydrogen to the reactor, the present process advantageously provides improved control of the properties of prepared polymers, particularly melt flow rate, molecular weight and molecular weight distribution. The present process thus also allows obtaining polymers having improved compositional homogeneity, particularly improved melt flow rate consistency.

Very surprisingly, it has been found that the improved control of the hydrogen concentration in the polymerization reactor also leads to an improved reactor stability. In particular, this improvement is evidenced by the improved stability of the reactor temperature. Conducting the polymerization under more stable conditions allows the polymerization reactor to be run closer to its physical design limits, thereby increasing polymer output.

Thus, very surprisingly the Applicant has found that the polymerization process of the present invention allows to improve polymer quality and at the same time to increase the polymer production of a polymerization reactor.

The present invention may also be applied when two or more than two polymerization reactors are serially connected. In this case the olefin polymer discharged from the first polymerization reactor is transferred to a second polymerization reactor, in which the polymerization reaction is continued either under the same or similar polymerization conditions or under different polymerization conditions. If different polymerization conditions are used, the olefin polymers produced in each polymerization reactor will have different properties. For example if the olefin polymers produced in the reactors have different molecular weights, the resulting olefin polymer composition will have a bimodal (when two reactors are used) or even a multimodal (when more than two reactors are used) molecular weight distribution.

If the polymerization is conducted in two or more than two serially connected polymerization reactors, olefin monomer and the one or more optional comonomers are fed to each reactor. However, depending upon the olefin polymer composition that is to be produced it may not be necessary or it may even be undesired to feed the at least one polymerization catalyst, and hydrogen to any one or even all of the subsequent polymerization reactors.

If the polymerization is conducted in two or more two serially connected polymerization reactor, it is preferred that hydrogen, wherever required, is fed to any one or all the respective polymerization reactors at the same ratio of volume to feed rate as defined earlier in this application.

To further improve the control of the hydrogen concentration in any one or all of the polymerization reactors where hydrogen is to be fed, it is preferred that the number and locations of the hydrogen feedings points on the respective reactor(s) are as defined before for a single polymerization reactor.

Hydrogen Feeding System

The present invention also provides a hydrogen feeding system for feeding hydrogen to a polymerization reactor. The hydrogen feeding system of the present invention is characterized in that hydrogen is fed to the polymerization reactor at a ratio of hydrogen feed line volume to hydrogen mass flow of at most at most $5.0\,l\,kg^{-1}\,h$, preferably of at most $4.0\,l\,kg^{-1}\,h$, more preferably of at most $3.0\,l\,kg^{-1}\,h$, even more preferably of at most $2.0\,l\,kg^{-1}\,h$, and most preferably of at most $1.0\,l\,kg^{-1}\,h$. Preferably the ratio of hydrogen feed line volume to hydrogen mass flow is at least $0.001\,l\,kg^{-1}\,h$, and most preferably at least $0.01\,l\,kg^{-1}\,h$.

The hydrogen feeding system of the present invention comprises at least one hydrogen feeding point for feeding hydrogen to the polymerization reactor, as disclosed earlier in the present application.

Additionally, the hydrogen feeding system of the present invention comprises one or more controlling means for controlling hydrogen mass flow to the polymerization reactor.

Further, the hydrogen feeding system of the present invention comprises one or more flow measuring means to determine the amount of hydrogen, i.e. the hydrogen mass flow, that is fed to the polymerization reactor. Preferably, said flow measuring means is a Coriolis type flow meter or a gravimetric type flow meter.

Provided that there are at least two hydrogen feeding points, it is preferred that the hydrogen mass flow is separately controlled for each hydrogen feeding line leading to the at least two hydrogen feeding points. In one embodiment, each hydrogen feeding line is provided with or connected to a separate flow controlling means for controlling the mass flow of hydrogen into the reactor. In another embodiment, the number of flow controlling means is lower that the number of hydrogen feeding points. The multiple flow controlling means can be spatially separated, or they can be centralized and close to each other in space.

Preferably, the hydrogen injection system of the present invention may also comprise one or more mixing means for mixing hydrogen with the olefin monomer and optionally with the one or more optional comonomer(s) prior to injection into the polymerization reactor.

Preferably, the hydrogen feeding system of the present invention is designed so as to minimize leakages. This is desirable for reasons of plant security but also for reasons of precision of flow. Leakages in the hydrogen feeding system have been found to lead to variations in the amounts of hydrogen that are actually fed to the polymerization reactor and in consequence, result in the production of a polyolefin with non-uniform properties. It is therefore preferred that all connections between tubes, valves, flow meters and any other elements present in the hydrogen feeding system of the present invention be welded connections as opposed to screw-type connections.

The hydrogen feeding system of the present invention is also characterized in that the volume of the hydrogen feed line between the flow controlling means and the polymerization reactor is minimized as much as possible. Therefore, it is preferred that all by-passes of valves and flow meters are eliminated. Instead the hydrogen feeding system of the present invention relies on a system of at least two double block and bleed systems in parallel.

Thus, the present invention also relates to a polymerization reactor comprising the hydrogen feeding system of the present invention. Further, the hydrogen system may be comprised on any one or all of the polymerization reactors if two or more polymerization reactors are serially connected.

Referring now to FIG. 1, an embodiment of a single hydrogen injection system 100 according to the present invention is illustrated in combination with a single polymerization reactor 101, which is schematically represented by a loop reactor but can be any other type of polymerization reactor. Hydrogen flow is regulated by flow controlling means 104, which may be for example a flow control valve. Hydrogen flow is metered by flow meter 106. The function of check valve 108 is to avoid any backflow from the polymerization reactor into the hydrogen feeding system. Valves 102, 105 and 110 can be used to shut off parts of the hydrogen injection system in case of maintenance etc. Valves 103, 107 and 109 can be used for purging the hydrogen feeding system.

Polymerization Reactor

The present invention also provides a polymerization reactor comprising the hydrogen feeding system of the present invention.

The type of polymerization reactor to which the process of the present invention can be applied include but are not limited to stirred tank reactors, loop reactors, gas phase reactors, tubular reactors, autoclaves, and combinations thereof. It is, however, preferred that the polymerization reactor used in the present invention is a loop reactor or a gas phase reactor. It is, however, most preferred that it is a loop reactor, which comprises a plurality of interconnected pipes defining a flow path for a polymer slurry, said slurry consisting essentially of monomer, one or more optional co-monomer(s) such as for instance 1-hexene, a polymerization catalyst, liquid diluent and solid ethylene polymer particles, means for feeding monomer, one or more optional co-monomer(s), and diluent in the reactor, means for feeding a polymerization catalyst in the reactor, at least one circulating means, such as a pump or a compressor, suitable for maintaining the polymer slurry in circulation in said reactor, and means for discharging the polymer slurry from the polymerization reactor.

Said means for discharging polymer slurry may be
one or more settling legs connected to the pipes of said reactor for settling of polymer slurry, and
one or more lines for discharging settled polymer slurry out of the reactor, or alternatively a continuous polymer slurry withdrawal system.

In a preferred embodiment the present invention provides for two serially connected polymerization reactors, wherein either one or both of the polymerization reactors comprises the hydrogen feeding system of the present invention. The most preferred polymerization reactor is a loop reactor.

EXAMPLES

The advantages of the present invention are demonstrated by the following examples.

Ethylene and 1-hexene were copolymerized in a slurry loop reactor with a reaction volume of approximately 100 m$^3$ in presence of a supported metallocene-based polymerization catalyst under standard polymerization conditions using isobutane as diluent. The resulting ethylene-hexene copolymer had a target density of 0.934 cm$^3$ (measured according to ASTM-D 1505 at 23° C.) and a target MI2 (measured according to ISO 1133, condition D, at a temperature of 190° C. and a load of 2.16 kg). Hydrogen was fed to the polymerization reactor at the ratios of hydrogen feed line volume to hydrogen mass flow as indicated in table 1.

TABLE 1

|  | Example 1 | Example 2 | Comparative example 1 |
|---|---|---|---|
| Hydrogen feed line | | | |
| Diameter (m) | 0.003125 | 0.0125 | 0.0375 |
| Length (m) | 20 | 10 | 70 |
| Volume (l) | 0.153 | 1.227 | 77.273 |
| Hydrogen | | | |
| Mass flow (g h$^{-1}$) | 195 | 526.5 | 1053 |
| Ratio (l kg$^{-1}$ h) | 0.79 | 2.33 | 73 |
| Homogeneity of melt flow rate of the polyethylene | Very good | Good | Bad |

The evolution of the melt index MI2 during the production campaigns of example 1 and comparative example 1 is graphically illustrated in FIG. 2. The data of example 1 clearly shows that the polymerization process in accordance with the present invention allows for much improved control of the melt index, i.e. the obtained melt flow index stays within the targeted melt index range. By comparison the data of example 1 frequently veers outside of the targeted melt index range, which in FIG. 2 is indicated by the dashed straight lines parallel to the x-axis.

By allowing to produce a polyethylene that is consistently within the targeted melt index range the compositional homogeneity of the polyethylene is improved and less material had to be off-graded for deviation on melt flow index.

The invention claimed is:

1. A hydrogen feeding system for feeding only hydrogen to a polymerization reactor for the polymerization of an olefin monomer and one or more optional comonomers, said hydrogen feeding system comprising:
at least one hydrogen feeding point for feeding only hydrogen to the polymerization reactor,
at least one gas flow control valve for controlling mass flow of only hydrogen, and
at least one gas flow meter for determining the mass flow of only hydrogen to the polymerization reactor,
wherein the gas control valve is adapted to limit feed of only hydrogen to the polymerization reactor at a ratio of hydrogen feed line volume to hydrogen mass flow of at most 5.0 l kg$^{-1}$ h.

2. A polymerization reactor comprising:
a hydrogen feeding system for feeding only hydrogen to the polymerization reactor for the polymerization of an olefin monomer and one or more optional comonomers, said hydrogen feeding system comprising:
at least one hydrogen feeding point for feeding only hydrogen to the polymerization reactor,
at least one gas flow control valve for controlling mass flow of only hydrogen, and
at least one gas flow meter for determining the mass flow of only hydrogen to the polymerization reactor,
wherein the gas flow control valve is adapted to limit feed of only hydrogen to the polymerization reactor at a ratio of hydrogen feed line volume to hydrogen mass flow of at most 5.0 l kg$^{-1}$ h.

3. The polymerization reactor according to claim 2, wherein said polymerization reactor is a polymerization loop reactor suitable for the polymerization of monomer with one or more optional olefin co-monomer(s), comprising:
a plurality of interconnected pipes defining a flow path for a polymer slurry, said slurry consisting essentially of monomer, one or more optional co-monomer(s), a polymerization catalyst, liquid diluent and solid ethylene polymer particles,
at least one pump or a compressor for maintaining the polymer slurry in circulation in said polymerization reactor,
one or more settling legs for discharging the polymer slurry from the polymerization reactor.

4. The polymerization reactor according to claim 2, wherein the gas flow control valve is adapted to limit hydrogen feed to the polymerization reactor at a ratio of hydrogen feed line volume to hydrogen mass flow in the range from 0.001 l kg$^{-1}$ h to 5.0 l kg$^{-1}$ h.

5. The polymerization reactor according to claim 2, wherein the hydrogen feeding system comprises from two to eight hydrogen feeding points.

6. The polymerization reactor according to claim 5, wherein the hydrogen feeding points are positioned spatially separated from each other.

7. The polymerization reactor according to claim 2, wherein the polymerization reactor has an elongated shape.

8. The polymerization reactor according to claim 2, wherein the polymerization reactor is a loop reactor.

9. The hydrogen feeding system according to claim 1, wherein the gas flow control valve is adapted to limit hydrogen feed to the polymerization reactor at a ratio of hydrogen feed line volume to hydrogen mass flow in the range from 0.001 l kg$^{-1}$ h to 5.0 l kg$^{-1}$ h.

10. The hydrogen feeding system according to claim 1, wherein the hydrogen feeding system comprises from two to eight hydrogen feeding points.

11. The hydrogen feeding system according to claim 10, wherein the hydrogen feeding points are positioned spatially separated from each other.

12. The hydrogen feeding system according to claim 1, wherein the gas flow meter is a Coriolis type flow meter or a gravimetric type flow meter.

13. The polymerization reactor according to claim 2, wherein the polymerization reactor is a stirred tank reactor, a gas phase reactor, an autoclave, or combinations thereof.

\* \* \* \* \*